United States Patent
Chang et al.

(10) Patent No.: US 8,294,578 B2
(45) Date of Patent: Oct. 23, 2012

(54) ALARM SYSTEM AND METHOD FOR DETACHABLE ELECTRONIC DEVICE

(75) Inventors: Li-Ying Chang, Taipei Hsien (TW); Chun-Te Yeh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 731 days.

(21) Appl. No.: 12/499,101

(22) Filed: Jul. 8, 2009

(65) Prior Publication Data
US 2010/0308996 A1  Dec. 9, 2010

(30) Foreign Application Priority Data
Jun. 3, 2009  (CN) .......................... 2009 1 0302868

(51) Int. Cl.
G08B 13/12  (2006.01)
(52) U.S. Cl. ............... 340/568.2; 340/568.1; 340/568.4
(58) Field of Classification Search ............... 340/568.2, 340/568.1, 568.3, 568.4, 571
See application file for complete search history.

(56) References Cited

U.S. PATENT DOCUMENTS

| | | | | |
|---|---|---|---|---|
| 5,748,083 A * | 5/1998 | Rietkerk | ................... | 340/568.2 |
| 5,838,225 A * | 11/1998 | Todd | ............... | 340/571 |
| 5,926,092 A * | 7/1999 | Kim | ............... | 340/571 |
| 6,026,492 A * | 2/2000 | Cromer et al. | ................ | 726/35 |
| 6,147,603 A * | 11/2000 | Rand | ................ | 340/568.2 |
| 6,300,874 B1 * | 10/2001 | Rand | ................ | 340/568.2 |
| 6,459,374 B1 * | 10/2002 | Rand et al. | ................ | 340/568.2 |
| 7,026,933 B2 * | 4/2006 | Kim | ............... | 340/568.1 |
| 7,135,971 B2 * | 11/2006 | Kim | ............... | 340/568.1 |
| 7,362,227 B2 * | 4/2008 | Kim | ............... | 340/571 |
| 2002/0171546 A1 * | 11/2002 | Evans et al. | ................ | 340/540 |
| 2005/0073423 A1 * | 4/2005 | Kim | ............... | 340/686.1 |
| 2006/0152365 A1 * | 7/2006 | Kim | ............... | 340/571 |
| 2011/0012735 A1 * | 1/2011 | Kestenbaum | ............... | 340/568.1 |
| 2011/0187532 A1 * | 8/2011 | Edelstein et al. | ............... | 340/571 |

* cited by examiner

*Primary Examiner* — Travis Hunnings
(74) *Attorney, Agent, or Firm* — Altis Law Group, Inc.

(57) ABSTRACT

An alarm system is applied for a computer to warn an owner of an electronic device via a terminal when the electronic device is detached from the computer. The alarm system includes a memory unit and a main controller connected the memory unit. The main unit controller includes a recording unit, a determining unit, and an information obtaining transmitting unit. The recording unit is used to log the electronic device detachably connected to the computer. The determining unit is used to determine whether the electronic device detachably connected to the computer is detached from the computer. The information obtaining transmitting unit is used to read the alarm information from the memory unit when the electronic device is detached from the computer, and transmit the alarm information to the owner' terminal.

12 Claims, 2 Drawing Sheets

ALARM SYSTEM AND METHOD FOR DETACHABLE ELECTRONIC DEVICE

BACKGROUND

1. Technical Field

The present disclosure relates to an alarm system and an alarm method for a detachable electronic device.

2. Description of Related Art

With the miniaturization of electronic devices, most electronic devices can be carried easily about by users so that the electronic devices can be use expediently, especially universal serial bus (USB) devices, such as a USB flash disks or portable hard drives. However, users sometimes forget to take the USB devices with then after use, which will cause the USB devices to be easily stolen.

DETAILED DESCRIPTION

Figure 1:
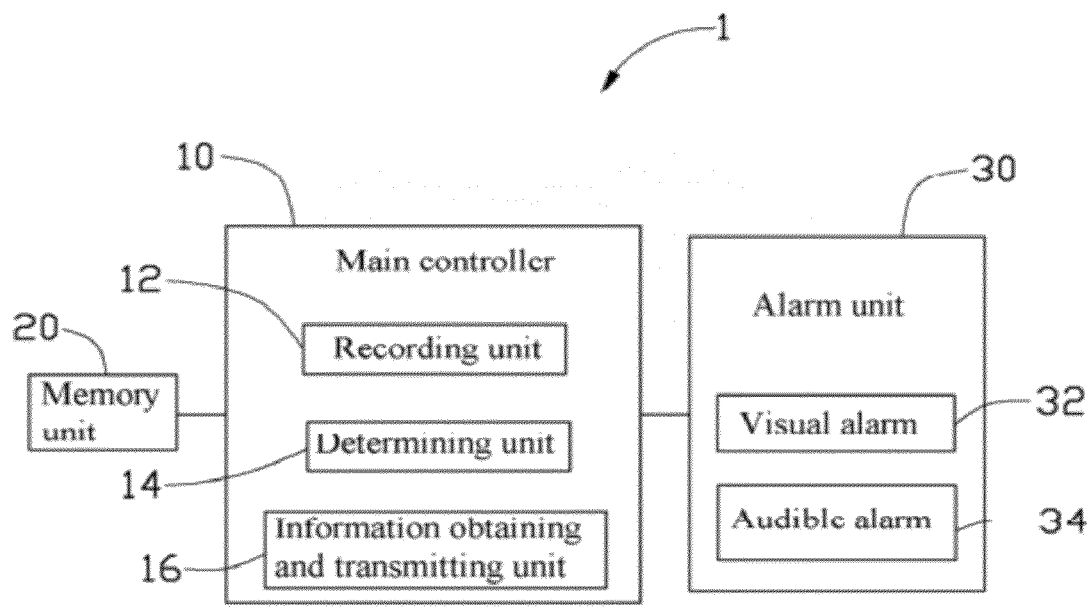
FIG. 1 is block diagram of an exemplary embodiment of an alarm system.

Referring to FIG. 1, an exemplary embodiment of an alarm system 1 is applied to a computer to warn that an electronic device detachably connected with a computer system has been detached via a mobile device. In one embodiment, the mobile device is a mobile telephone. The electronic device is a universal serial bus (USB) device. The alarm system 1 includes a main controller 10, a memory unit 20, and an alarm unit 30. The main controller 10 is connected between the memory unit 20 and the alarm unit 30. The alarm unit 30 is used to send alarm signals and includes a visual alarm 32 and an audible alarm 34. The main controller 10 includes a recording unit 12, a determining unit 14, and an information obtaining and transmitting unit 16.

The memory unit 20 is used to store an identifier, such as a telephone number of the owner and an alarm information bound with the telephone number, such as "the USB device is stolen."

The recording unit 12 is to log USB devices connected to the computer.

The determining unit 14 is to determine whether the USB devices logged by the recording unit 12 have been detached from the computer, and whether new USB devices are detachably connected to the computer.

The information obtaining and transmitting unit 16 is to read the telephone number and the alarm information from the memory unit 20 when the determining unit 14 detects that a USB device has been detached from the computer, and transmit the alarm information to a mobile telephone corresponding to the telephone number via network supplied by a mobile telecom carrier.

The visual alarm 32 is used to output a visual alarm signal when the USB devices connected to the computer are detached from the computer. The audible alarm 34 is used to output an audible alarm signal when the USB devices are detached from the computer, so as to warn that the USB devices has been detached and also to prevent the USB devices from being stolen.

In other embodiments, the alarm unit 30 can be omitted. The alarm information can be transmitted to the owner's mobile telephone corresponding to the telephone number stored in the memory unit 20. The mobile device can be other kinds of devices.

Figure 2:
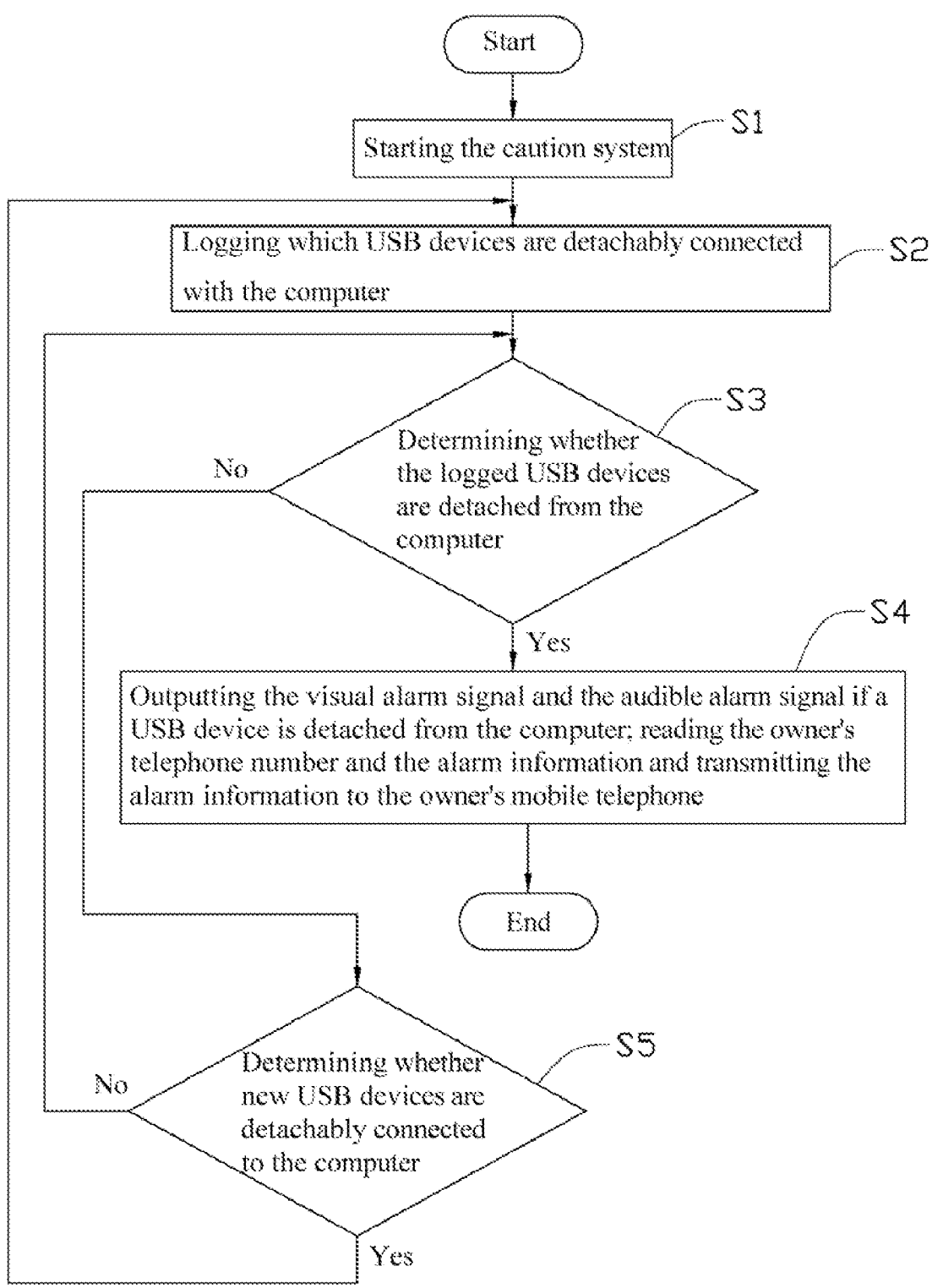
FIG. 2 is a flowchart of an exemplary embodiment of an alarm method of the alarm system of FIG. 1.

Referring to FIG. 2, an exemplary embodiment of an alarm method using the above-mentioned alarm system 1 includes the following steps.

In step 1, the alarm system 1 is started.

In step 2, the recording unit 12 logs USB devices detachably connected with the computer.

In step 3, the determining unit 14 determines whether the USB devices logged by the recording unit 12 are detached from the computer. If the USB devices are detached from the computer, the procedure goes to step 4. If none of the USB devices is detached from the computer, the procedure goes to step 5.

In step 4, the visual alarm 32 outputs the visual alarm signal at the same time, or alternatively, the audible alarm 34 outputs to the audible alarm signal to warn the owner of the USB device has been detached and frighten a person who detaches the USB device from the computer; the information obtaining and transmitting unit 16 reads the owner's telephone number and the alarm information bound with the telephone number from the memory unit 20 and transmits the alarm information to the owner' mobile telephone corresponding to the telephone number stored in the memory unit 20 to warn the owner.

In step 5, the determining unit 14 determines whether new USB devices are detachably connected to the computer. If the determining unit 14 determines the computer is detachably connected to new USB devices, the procedure returns to the step 2. If the determining unit 14 determines the computer is not detachably connected to new USB devices, the procedure ends.

For example, when an owner is using a USB device to transmit data to the computer, if the owner needs to leave, the owner starts the alarm system 1. The recording unit 12 logs the USB device is detachably connected to the computer. The USB device is detached from the computer. The determining unit 14 determines the USB device is detached from the computer. The visual alarm 32 outputs the visual alarm signal and the audible alarm 34 outputs the audible alarm signal to the owner. The information obtaining and transmitting unit 16 reads the alarm information and the telephone number from the memory unit 20 and transmits the alarm information to the owner's mobile telephone corresponding to the telephone number via network supplied by a mobile telecom carrier, to warn the owner.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An alarm system applied for a computer to warn an owner of an electronic device detachably connected with the computer via a terminal when the electronic device is detached from the computer, the alarm system comprising:
   a memory unit to store an alarm information; and
   a main controller connected the memory unit, the main controller comprising:
      a recording unit to log electronic devices detachably connected with the computer;

a determining unit to determine whether the electronic device detachably connected to the computer is detached from the computer; and an information obtaining and transmitting unit to read the alarm information from the memory unit when the electronic device is detached from the computer, and transmit the alarm information to the owner' terminal.

2. The alarm system of claim 1, wherein the memory unit is further to store a terminal identifier corresponding to the terminal, the information obtaining and transmitting unit is to further read the identifier, and transmit the alarm information to the terminal according to the identifier.

3. The alarm system of claim 1, further comprising an alarm unit connected the main controller, wherein the alarm unit comprises a visual alarm and/or an audible alarm, the visual alarm is used to output a visual alarm signal when the electronic device detachably connected to the computer is detached from the computer, the audible alarm is used to output an audible alarm signal when the electronic device detachably connected to the computer is detached from the computer.

4. The alarm system of claim 1, wherein the determining unit is further to determine whether a new electronic device is detachably connected to the computer, the recording unit logs the new electronic device in response to the new electronic device being detachably connected to the computer.

5. The alarm system of claim 1, wherein the electronic device is a universal serial bus device.

6. An alarm system applied for a computer to warn an owner of an electronic device when the electronic device is detached from the computer, the alarm system comprising:

a main controller comprising:

a recording unit to log the electronic device connected to the computer;

a determining unit to determine whether the electronic device connected to the computer is detached from the computer; and an alarm unit connected to the main controller to output an alarm signal to warn the owner when the electronic device is detached from the computers;

wherein the determining unit is further to determine whether a new electronic device is detachably connected to the computer, the recording unit logs the new electronic device in response to the new electronic device being detachably connected to the computer.

7. The alarm system of claim 6, wherein the alarm unit comprising a visual alarm and/or an audible alarm, the visual alarm is used to output a visual alarm signal when the electronic device detachably connected to the computer is detached from the computer, the audible alarm is used to output an audible alarm signal when the electronic device detachably connected to the computer is detached from the computer.

8. The alarm system of claim 6, wherein the electronic device is universal serial bus device.

9. An alarm method for warning an owner of an electronic device via a terminal when the electronic device is detached from the computer comprising:

A: logging the electronic device detachably connected to a computer;

B: determining whether the recorded electronic device is detached from the computer;

C: transmitting an alarm information to a terminal in response to the electronic device being detached from the computer; and D: determining whether the computer is detachably connected to a new electronic device in response to the computer is not detached from the electronic device; if the computer is detachably connected to the new electronic device, returning to the step A; and if the computer is not detachably connected to a new electronic device, returning to the step B.

10. The alarm method of claim 9, wherein a visual alarm outputs a visual alarm signal and/or an audible alarm outputs an audible alarm signal when the electronic device is detached from the computer.

11. The alarm method of claim 9, further comprising:

reading the alarm information and an identifier corresponding to a terminal before the step C, and transmitting the alarm information to the terminal according to the identifier.

12. The alarm method of claim 9, wherein the electronic device is universal serial bus device.

* * * * *